(12) United States Patent
Donnet

(10) Patent No.: US 10,751,674 B2
(45) Date of Patent: Aug. 25, 2020

(54) MIXING DEVICE

(71) Applicant: FERTON HOLDING S.A., Delemont (CH)

(72) Inventor: Marcel Donnet, Saint Jean de Gonville (FR)

(73) Assignee: FERTON HOLDING S.A., Delemont (CH)

( * ) Notice: Subject to any disclaimer, the term of this patent is extended or adjusted under 35 U.S.C. 154(b) by 35 days.

(21) Appl. No.: 15/462,490

(22) Filed: Mar. 17, 2017

(65) Prior Publication Data

US 2017/0189867 A1   Jul. 6, 2017

Related U.S. Application Data

(63) Continuation of application No. 14/051,219, filed on Oct. 10, 2013.

(30) Foreign Application Priority Data

Oct. 15, 2012   (DE) .................. 10 2012 109 797

(51) Int. Cl.
| | |
|---|---|
| *B01F 3/06* | (2006.01) |
| *A61C 3/025* | (2006.01) |
| *B24C 7/00* | (2006.01) |
| *B01F 15/02* | (2006.01) |
| *B01F 15/00* | (2006.01) |

(52) U.S. Cl.
CPC .............. *B01F 3/068* (2013.01); *A61C 3/025* (2013.01); *B01F 15/00779* (2013.01); *B01F 15/0292* (2013.01); *B24C 7/0046* (2013.01); *B01F 2215/0027* (2013.01)

(58) Field of Classification Search
CPC .......... B01F 5/0206; B01F 3/06; A61C 1/087; B24C 7/0015; B24C 7/0046; B24C 7/0053; B24C 7/0061; B24C 7/0092
See application file for complete search history.

(56) References Cited

U.S. PATENT DOCUMENTS

| | | | | |
|---|---|---|---|---|
| 3,737,288 | A * | 6/1973 | Hochman | B01F 7/22 366/270 |
| 3,852,918 | A * | 12/1974 | Black | B24C 7/0053 451/99 |
| 4,002,325 | A * | 1/1977 | Herfeld | B01F 13/0244 34/586 |

(Continued)

FOREIGN PATENT DOCUMENTS

EP   0119735 B2   9/1993

*Primary Examiner* — Elizabeth Insler
(74) *Attorney, Agent, or Firm* — Arent Fox LLP

(57) ABSTRACT

The mixing device for mixing a powder with a pressurized gas, comprising a mixing chamber (20) with an inlet area (22), which has at least one inlet opening (24), by way of which powder and/or pressurized gas and/or a mixture thereof may be introduced into the mixing chamber (20), and at least one outlet area (26), which is designed for withdrawing from the mixing chamber (20) a main flow (HR) of a gas or powder or a powder and gas mixture directed along the mixing chamber (20) which essentially extends from the inlet area (22) to the outlet area (26), characterized in that a regulating device (10) is arranged along and/or in continuation of the main flow (HR), regulating the main flow (HR) of the gas or powder or powder and gas mixture.

19 Claims, 4 Drawing Sheets

(56) References Cited

U.S. PATENT DOCUMENTS

Figure 1:
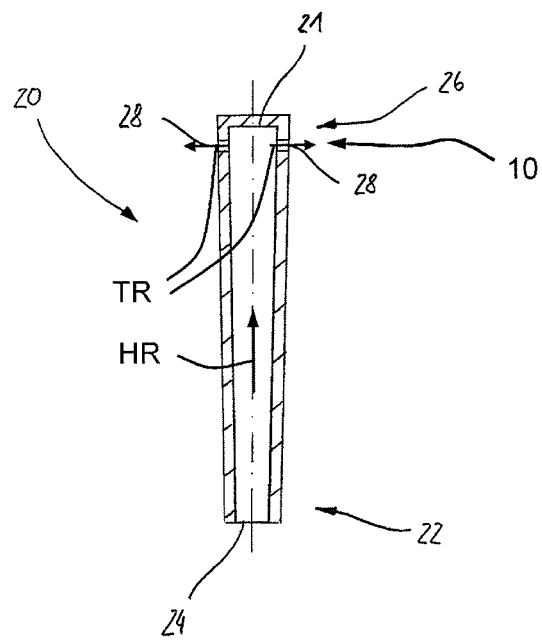

| | | | |
|---|---|---|---|
| 6,083,001 A | 7/2000 | Deardon et al. | |
| 6,325,624 B1 | 12/2001 | Kutsch et al. | |
| 6,488,402 B1 * | 12/2002 | King | B01F 3/0446 366/173.2 |
| 7,980,923 B2 | 7/2011 | Olmo et al. | |
| 2006/0160046 A1 | 7/2006 | Nesbitt et al. | |
| 2008/0233540 A1 * | 9/2008 | Olmo | A61C 3/025 433/215 |

* cited by examiner

MIXING DEVICE

This application is a Continuation of U.S. application Ser. No. 14/051,219 filed Oct. 10, 2013, which claims priority to German Patent Application No. 102012109797.6 filed on Oct. 15, 2012. The disclosures of the prior applications are incorporated in their entirety herein by reference.

The present invention relates to a mixing device for mixing a powder with a pressurized gas, a powder container, a lid, an insert and a process for mixing powder and gas as well as a use of a mixing device in a dental device.

From prior art, such as for example U.S. Pat. No. 7,980,923 B2 or EP 011 9735 B2, powder jet devices or dental abrasive jet devices are known, wherein dental powder which is provided in a container is supplied to a nozzle arrangement of a hand piece attached by way of a discharge line, generally by mixing in pressurized water, in association with a gaseous carrier medium. A preferably replaceable powder container is attached to a powder jet device such that an amount of powder which is provided in the powder container is continuously conveyed to a mixing chamber, the powder is mixed into the air flow which is passed through the mixing chamber and is supplied to a hand piece and an exit nozzle associated thereto as a powder and air mixture for dental treatment. The problem associated with it is that during introducing the powder into the mixing chamber clogs often will arise, especially if small particle size powders will be used. To dissolve these clogs it will not be sufficient to solely extend the entry areas into the mixing chamber since such inlet extensions solely result in an increase of bulk flows which are transported, occasionally exceeding the dosage necessary for any dental treatment.

It is thus the object of the present invention to provide a mixing device for mixing a powder with a pressurized gas, a powder container, a lid, an insert and a process for mixing a powder and a gas as well as an adequate use in a dental device, by way of which clogging of the mixing chamber will become avoidable and the main flow of the powder and/or gas and/or powder and gas mixture will be regulated.

This object will be solved by a mixing device according to claim 1, a powder container according to claim 8, a lid according to claim 14, an insert according to claim 15, a process according to claim 16 as well as a use of a mixing device in a dental device according to claim 17. Further advantages and features of the invention will arise from the dependent claims as well as the description and the accompanying figures.

According to the invention a mixing device for mixing a powder with a pressurized gas comprises a mixing chamber with an inlet area having at least one inlet opening, through which powder and/or pressurized gas or a mixture thereof may be introduced into the mixing chamber, and at least one outlet area designed for withdrawing from the mixing chamber a main flow of a gas or powder or powder and gas mixture directed along the mixing chamber which essentially extends from the inlet area to the outlet area, characterized in that along and/or in continuation of the main flow a regulating device is arranged which regulates the main flow of the gas or powder or powder and gas mixture. Advantageously the mixing device is part of a powder jet device.

Preferably the powder jet device has at least one powder container comprising a powder supply. The mixing chamber is preferably arranged within the powder supply, and is especially arranged in a way such that the inlet area or the at least one inlet opening, respectively, will be in contact with powder. Furthermore the powder jet device has at least one gas entry with a nozzle. Advantageously the nozzle is surrounded by powder and faces toward the at least one inlet opening. Furthermore the powder container preferably has a discharge which is connected to an exit nozzle where a powder and gas mixture and occasionally water will exit while being under pressure. Advantageously the exit nozzle is attached to a hand piece by means of which a treating dentist may specifically direct the powder and gas mixture to the operating site.

In a preferred embodiment the powder is entrained by a gas flow, and is especially entrained into the mixing chamber by an air flow exiting the nozzle. Preferably the inlet area or the at least one inlet opening, respectively, is therefore located close to the powder or is enclosed by powder, respectively. The nozzle virtually is directed in the direction of the inlet area or the at least one inlet opening, respectively, and by being enclosed by powder as well, it is suitable to entrain powder into the mixing chamber. In this embodiment a main flow of a powder and gas mixture will thus result essentially extending from the inlet area of the mixing chamber to the outlet area of the mixing chamber.

It will thus be an advantage that a regulating device is arranged along the main flow or in continuation of it, respectively, suitable of regulating the main flow of the gas or powder or powder and gas mixture. By this, the bulk flow may especially be adapted to the treatment to be performed, for example the dental or dental ceramic or esthetic treatment, respectively. In this context it is of advantage, that the inlet area of the mixing chamber or the at least one inlet opening, respectively, will be dimensioned or may be arranged in a relation to the nozzle, respectively, such that clogging of the inlet area or the at least one inlet opening, respectively, does not occur.

Advantageously, in this configuration very fine powders, i.e. powders of small particle size, may thus also be utilized. Additionally, use of a wide variety of different powder particle sizes is appropriate, since particle sizes having very different dimensions, i.e. very small as well as very large dimensions, may be processed in the mixing device. Advantageously the regulating device is arranged close to the outlet area of the mixing chamber. Alternatively, the regulating device is preferably arranged further downstream of the main flow, i.e. past the mixing chamber. Consequently, it is not a certain position of the regulating device at the mixing chamber which is essential. The position of the regulating device will preferably be selected such that it is close to a turbulence chamber of a powder container. By the term "main flow" the major flow of the gas and/or the powder and/or the powder and gas mixture is meant, i.e. there are not meant any turbulences or the like, which of course may also arise. The main flow does not necessarily be the only one. The main flow rather may be divided into several partial flows. In turn, several main flows may also be recombined into one single main flow.

The outlet area suitably is along the main flow in the mixing chamber, essentially opposite to the at least one inlet area, wherein the regulating device has at least one regulating orifice essentially extending transversely to the direction of the main flow, and preferably extending within the mixing chamber. It is understood, that the arrangement of the outlet area and inlet area opposing each other is not necessarily required. In an elongated essentially tubularly-formed mixing chamber this configuration may be appropriate; similarly, the inlet area and/or the outlet area may also advantageously be arranged radially to the main flow in and/or on the mixing chamber. If the inlet area solely contains one inlet opening, powder and/or gas may preferably be fed to the mixing chamber through this opening. It may as well be preferable to provide several inlet openings. In this way, gas may advantageously be fed to the mixing chamber through an inlet opening and powder may be fed to the mixing chamber through another inlet opening. It is understood, that such a configuration may be more than optimal. Alternatively, the powder preferably may as well be introduced into the mixing chamber by way of reduced pressure present in the mixing chamber or according to the Venturi effect. The fact that the at least one regulating orifice extends essentially transversely to the direction of the main flow has the advantage, that this redirection of the main flow is virtually obtainable by reduction of the flow rate. The main flow thus may virtually be stopped. In other words, energy, especially flow energy, may by way of this configuration virtually be withdrawn from the main flow by the at least one regulating orifice. Alternatively the regulating orifice may of course be parallel to the main flow.

Advantageously the regulating device has several regulating orifices which are designed to separate the main flow into several partial flows, wherein the regulating orifices, in relation to the direction of the main flow in the mixing chamber, may be arranged in equal and/or different angles to each other. If for example in the regulating device two regulating orifices are present, a single main flow extending from the inlet area of the mixing chamber to the outlet area thereof, or to the regulating device, respectively, may be divided into two partial flows by the regulating device. Preferably the regulating orifices, which in preferred embodiments are arranged transversely to the direction of the main flow in the mixing chamber, are arranged in a specified angle to each other. If three regulating orifices will be arranged transversely to the direction of the main flow in the regulating device, a preferred angle of a regulating orifice to the next regulating orifice is about 120°.

By this, a very homogenous and even distribution, respectively, of the individual main flows from the regulating device will be allowed. It is especially of advantage if the regulating device is arranged in a turbulence chamber, for example in the turbulence chamber of a powder container. Preferably 2, 4, 5, 6, 8, 10 or a plurality of regulating orifices, respectively, are provided.

Preferably at least two regulating orifices are arranged essentially in a plane transversely to the direction of the main flow in the mixing chamber, wherein the cross section of at least two regulating orifices may be different. Alternatively at least one regulating orifice may also be arranged offset to another regulating orifice along the direction of the main flow in the mixing chamber, i.e. it may be arranged non-coplanar, transversely to the direction of the main flow in the mixing chamber. As the cross section of at least two regulating orifices may be different, the geometry thereof may likewise be different. Preferably the at least one regulating orifice is circularly configured; alternatively, it preferably may also be configured as a polygon, slit or perforation etc.

Advantageously an end of the mixing chamber opposite to the inlet area of the mixing chamber is limited by a wall. In a preferred embodiment the regulating device hence is arranged at the outlet area of the mixing chamber and the wall of the mixing chamber virtually is a wall of the regulating device. Advantageously the wall has at least one regulating orifice. In other words, at least one regulating orifice hence is also arranged along the main flow of the mixing chamber, wherein the main flow consequently is not redirected, but virtually exits through the regulating device in extension of the mixing chamber. It is however preferred that one orifice is transversely to the main flow.

Advantageously the ratio of the area of the at least one inlet opening to the area of the at least one regulating orifice is ≥1. Advantageously the area(s) of one or more inlet openings is/are larger than the area(s) of one or more regulating orifices. Advantageously the regulating effect will thereby be enabled, and will be enabled by way of reduction of the bulk flow and/or volume flow and/or by way of energy dissipation of the main flow. Alternatively, the ratio may also be reciprocal, if for example the geometry of the inlet opening(s) and/or the regulating orifice(s) will be employed. The regulating device may thus contain a perforation, finally representing a plurality of regulating orifices and which, taken together, have a larger outlet cross section than the at least one inlet opening. The small size of any one perforation bore enables the main flow of a gas and/or powder and/or powder and gas mixture to still become regulatable.

Suitably the regulating device is formed as part of the mixing chamber. Still suitably the mixing chamber has an elongated extension which is formed cylindrically and/or is essentially formed conically tapered in the direction of the inlet area. Still preferably the regulating device is also attachable to the mixing chamber in a form closing and/or force closing manner. In this way the mixing chamber may virtually also be used as a retrofit solution for existing mixing chambers which still do not have a regulating device.

Advantageously the mixing chamber is adaptable in its length, diameter, and/or in its modification of diameter in the direction of the main flow to each of the powders which is being used, and/or is adaptable to a powder receptacle and/or a powder container.

According to the invention a powder container for a powder jet device comprises a powder receptacle for the reception of a powder, at least one gas entry, by way of which a pressurized gas may be introduced into the powder container, and a turbulence chamber, where powder is swirled by gas and may be withdrawn through at least one outlet opening as a powder and gas mixture, wherein the powder container has at least one mixing device. Advantageously the powder receptacle has different nozzle/conduit holders and different inserts, so that depending on the powder being used, different nozzle and turbulence configurations in the powder container may be realized. Preferably the powder receptacle in the powder container is replaceably arranged and there, in a housing, is sealingly connected to a coupling area.

The nozzle/conduit holder preferably is detachably arranged in the coupling area and is attached to the powder receptacle such that the pressurized gas may enter the powder receptacle and there may swirl the powder. Advantageously the powder receptacle is configured as a disposable article and is sealed with a removable cover sheet which will be removed after insertion of the powder receptacle into the powder container, so that the powder receptacle will be ready to use. In another preferred embodiment of the invention, however, the whole powder container is formed as a disposable article and may be disposed of after removal of the powder, so that extensive cleaning and sterilizing of the powder container may be omitted.

Preferably the gas entry terminates in a nozzle, which is arranged relative to an inlet opening of a mixing chamber, such that inhibition of the inlet opening by a powder is avoidable, in that the nozzle is not enclosed by the mixing chamber. Thus, the nozzle advantageously does not protrude into the inlet opening, i.e. the nozzle opening is not enclosed by the mixing chamber. By way of such protrusion an annular gap virtually arises between the nozzle and the occasionally roundly formed inlet opening. In prior art this annular gap may have such a small dimension that in this location or area, respectively, powders will cake or will cause clogging, respectively, for example even if the powder in this area will settle. In that in the present invention the nozzle is virtually arranged spaced apart from the inlet opening virtually the entire cross section of the inlet opening will be maintained. Preferably the nozzle distance between the nozzle in the direction of the at least one inlet opening is smaller than 15 mm, especially preferably smaller than 10 mm, even more preferably smaller than 5 mm.

Advantageously a regulating device of the mixing device is arranged within the turbulence chamber, wherein the mixing chamber for the arrangement within the powder container is connectable thereto in an indirect manner by way of at least one supporting bar and/or is connectable thereto in a direct manner. One arrangement of the regulating device within the turbulence chamber has the advantage, that the main flow or the individual partial flows, respectively, which is regulated by the regulating device is homogenizable by the turbulence in the turbulence chamber. From the turbulence chamber the main flow or the partial flows, respectively, may then be withdrawn through the outlet opening(s). The arrangement of the mixing chamber in the powder container is preferably realized by way of the at least one supporting bar. In advantageous embodiments three supporting bars disposed around the circumference of the mixing chamber will be used for the arrangement in the powder container or powder receptacle, respectively. By way of the supporting bars the mixing chamber virtually is insertable into the powder receptacle or the powder container, respectively.

Suitably, multiple regulating orifices are arranged in the mixing chamber essentially in a plane transversely to the direction of the main flow, as viewed in different angles to the at least one outlet opening. A preferred configuration with three regulating orifices, which are arranged about the circumference of a regulating device is as follows: a first regulating orifice is arranged in an angle of about 80° in clockwise direction starting from an outlet opening, the next regulating orifice is arranged in an angle of about 200° in relation to the outlet opening in a clockwise direction. The next regulating orifice in turn is arranged in an angle of about 320° in relation to the outlet opening. Advantageously, three supporting bars will be combined together with the three regulating orifices, so that the supporting bars, which virtually are configured as radial ribs, are arranged as follows: the first supporting bar has an angle of about 60° to the outlet opening, as viewed in a clockwise direction. The next supporting bar has an angle of about 180° to the outlet opening, as viewed in a clockwise direction, the next supporting bar in turn has an angle of about 300° in relation to the outlet opening, in a clockwise direction. In other words regulation of the main flow of the gas or powder or powder and gas mixture occasionally is not only done by the regulating device, but also by arranging and positioning the regulating orifices in relation to the outlet opening and/or arranging the supporting bars or radial ribs, respectively. It is understood, that also a plurality of outlet openings may be arranged, especially, 2, 3, 4, 5, 6, 8, 9 or even more.

In this context it may be of advantage that the at least one regulating orifice of the regulating device is offsetly arranged by an angle to the at least one supporting bar, as viewed in a plane transversely to the direction of the main flow in the mixing chamber. Advantageously the angle is in a range of about 20°.

Advantageously at least one aperture is arranged in front of the at least one outlet opening allowing the inlet geometry of the at least one outlet opening to be modified, wherein one or more apertures may be present on the powder container and/or on an insert for a powder container and/or on a lid for a powder container. In other words by way of the aperture the inlet geometry of the outlet opening is virtually regulatable or adaptable, respectively. Suitably the aperture or the cross section thereof, respectively, is larger than the outlet opening or the cross section thereof, respectively. Alternatively, the aperture or the cross section thereof, respectively, may preferably be formed smaller than the outlet opening or the cross section thereof, respectively. Preferably, multiple apertures will be provided to enabling the inlet geometry of the outlet opening to be reduced or modified, respectively, in different orders of magnitude. Still preferably, the mixing chamber may be arranged within the powder container or the powder receptacle, respectively, in fixed positions allowing the nozzle distance (i.e. the distance of the nozzle in the direction of the at least one inlet opening) to be modified and/or allowing different apertures to be arranged in front of the at least one outlet opening and/or allowing selection of that regulating orifice, which in the direction of the at least one outlet opening and/or the regulating orifice may be oriented to the at least one outlet opening with different exactness.

According to the invention a lid for a powder container and/or a powder receptacle, which form and/or force-lockingly may be arranged on a powder container and/or a powder receptacle have the mixing device according to the invention. Advantageously the mixing device may also be part of the lid. Thus, a mixing chamber is realized, onto which a regulating device is arranged, onto which, in turn, the lid is arranged. Alternatively, preferably the regulating device may also be arranged on the lid, wherein the mixing chamber represent a separate part, which in turn may form and/or force-lockingly attached to the regulating device. Similarly preferably, a form- and/or force-locking connection of the regulating device to the lid is conceivable. This is especially interesting for retrofit solutions if for example a regulating device is to be retro fitted.

According to the invention an insert for a powder container and/or a powder receptacle, which form and/or force-lockingly may be arranged in a powder container and/or a powder receptacle, has a mixing device. Advantageously an insert consists of a mixing chamber with at least one supporting bar, but especially consists of a mixing chamber with at least three supporting bars, wherein this arrangement may preferably be form and/or force-lockingly arranged in the powder receptacle and/or the powder container. Even here it applies, that the regulating device may be part of the insert, or it may form and/or force-lockingly attached to the insert.

According to the invention a method for mixing of powder and gas comprises the following steps:
  providing a powder and a gas;
  introducing powder and/or gas or a mixture thereof into a
     mixing chamber, essentially forming a main flow (HR)
     of the gas or the powder or the mixture thereof along
     the mixing chamber from an inlet area to an outlet area
     of the mixing chamber;
  conveying the main flow (HR) via the outlet area of the
     mixing chamber;
  regulating the main flow (HR) of the gas and/or powder
     and gas mixture by way of a regulating device.

Advantageously the arrangement of the regulating device at the outlet area of the mixing chamber is done such that in this area, too, regulation will be performed. Alternatively preferably, the main flow may also be conveyed behind the mixing chamber, for example by a conduit system, wherein subsequently the main flow will only be regulated in the progress of the conduit system, for example not before reaching the hand piece, by way of the regulating device. It is also part of the process that the main flow in the mixing chamber is divided by way of the regulating device, which has at least one regulating orifice, and will for example be fed to a turbulence chamber. From there, in preferred embodiments, the partial flows will be recollected into a main flow, which then for example will be conveyed in the direction of a hand piece. The "collection" of the partial flows preferably will be done through the at least one outlet opening, which preferably is arranged in an area of the turbulence chamber.

According to the invention the use of a mixing device in a dental device is characterized in that a main flow of a gas and/or powder and/or mixture thereof will be regulated by way of a regulating device.

Figure 2:
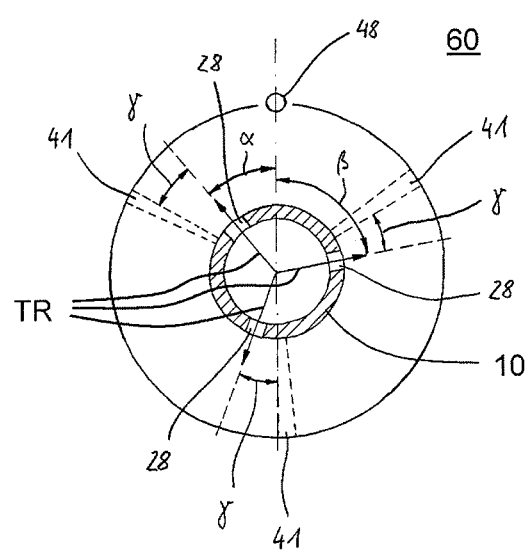
Figure 3:
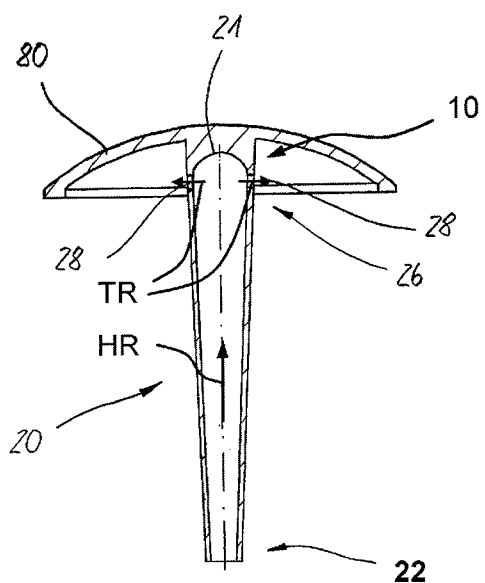
Figure 4:
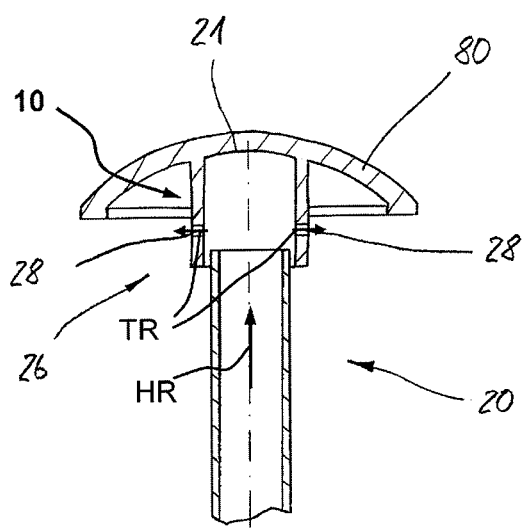
Figure 5:
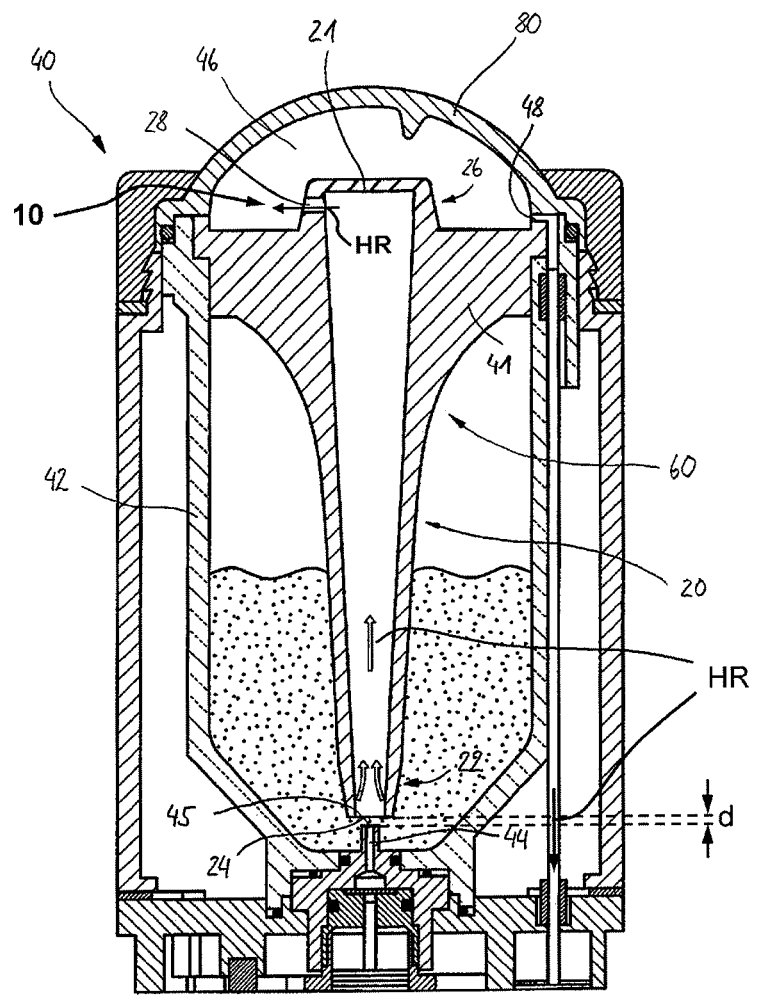
Figure 6:
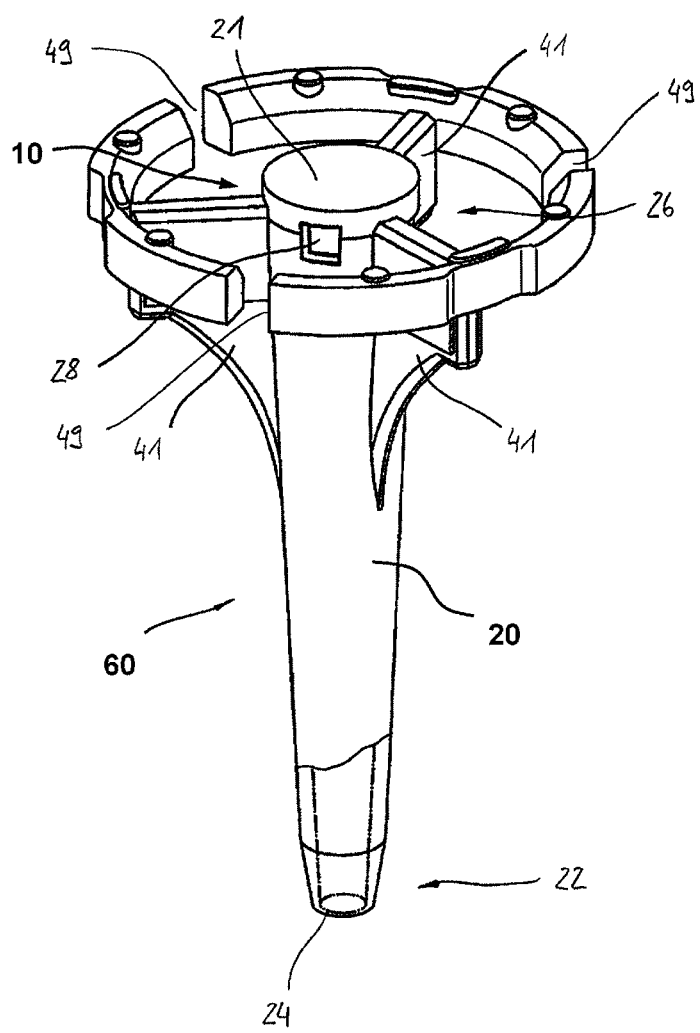

Further advantages and characteristics of the invention will arise from the following description of preferred embodiments of the mixing device of the invention, of the powder container of the invention, of the lid of the invention, of the insert of the invention and the process of the invention for mixing powder and gas wherein reference is made to the accompanying figures. Individual characteristics of the individual embodiments may be combined with each other within the scope of the invention, wherein:

FIG. 1: shows a sectional view of a preferred embodiment of a mixing device;

FIG. 2: shows a top view of a preferred embodiment of a mixing device or insert, respectively;

FIG. 3: shows a sectional view of a preferred embodiment of a lid with a mixing device;

FIG. 4: shows a sectional view of another preferred embodiment of a lid with a mixing device;

FIG. 5: shows a sectional view of a preferred embodiment of a powder container;

FIG. 6: shows a preferred embodiment of an insert with a mixing device.

FIG. 1 shows a preferred embodiment of a mixing device, which comprises a mixing chamber 20 and a regulating device 10. There is shown a main flow HR extending from an inlet area 22 in the direction of an outlet area 26 of the mixing chamber 20. The regulating device 10, which comprises two regulating orifices 28, as it is represented in the sectional view shown in FIG. 1, is arranged downstream of the main flow HR. The inlet area 22 of the mixing chamber 20 has an inlet opening 24. The regulating device 10 is limited by a wall 21, as viewed along the main flow HR. In preferred embodiments the wall 21 is arranged essentially transversely to the main flow HR in the mixing chamber 20, so that the main flow HR is virtually redirected, virtually exiting the regulating device 10 as partial flows TR through the regulating orifices 28 transversely to the main flow HR.

FIG. 2 shows a top view of a preferred embodiment of a mixing device of insert 60, respectively. Insert 60 comprises three supporting bars 41, which are arranged on a mixing chamber 20. In this representation in FIG. 2 the mixing chamber 20 may not explicitly be seen and is hence not provided with any reference numbers. Three partial flows TR exiting the regulating device 10 through the three regulating orifices 28 are shown in outline view. Especially interesting is a positioning or arrangement, respectively, of an outlet opening 48 in relation to the regulating orifices 28 or supporting bars 41, respectively. Each of the regulating orifices 28 is offset to the supporting bars 41 by an angle γ. In preferred embodiments the angle γ is about 10°-30°, preferably about 20°. As viewed in a clockwise direction, the first regulating orifice 28 is arranged in relation to the outlet opening 48 in an angle β, which, in preferred embodiments, is about 60° to 100°, preferably about 80°. The outlet opening 28 which, in a counterclockwise direction, is first arranged in relation to the outlet opening 48, is arranged in an angle α. In preferred embodiments the angle α is about 20° to 60°, preferably about 40°. The regulating orifice 28 which virtually is arranged opposite to the outlet opening 48 is arranged in an angle of about 140°-180°, preferably about 160° to the outlet opening 48, as viewed in a counterclockwise direction.

FIG. 3 shows a preferred embodiment of a mixing device, which is formed as a part of a lid 80 of a powder container. Subsequent to the regulating device 10, virtually distant of lid 80, there is a mixing chamber 20, which has an inlet area 22. The main flow HR is directed from the inlet area 22 in the direction of the outlet area 26 or the lid 80, respectively. The main flow HR will be regulated by way of two regulating orifices 28 and is withdrawn from the mixing chamber 20 or regulating device 10, respectively, as two partial flows TR.

FIG. 4 shows a preferred embodiment of a mixing device or lid 80, respectively. A regulating device 10 is arranged on the lid 80 or is integrally connected to the lid 80, respectively. A mixing chamber 20 partially protrudes into the regulating device 10. In the preferred embodiment, as represented, the mixing chamber 20 is not integrally formed with the regulating device 10. The regulating device 10 has two regulating orifices 28. In the region of the outlet area 26 of the mixing chamber 20 overlapping of the regulating device 10 and the mixing chamber 20 occurs. Due to this overlapping an annular gap will form between the regulating device 10 and the mixing chamber 20, by way of which a partial flow TR of a powder or gas or mixture thereof could also be withdrawn.

FIG. 5 shows a preferred embodiment of a powder container 40. A powder receptacle 42 is arranged in the powder container 40. An insert 60, in turn, which in the preferred embodiment, as represented, has at least two supporting bars 41, is arranged in the powder receptacle 42. The insert 60 comprises a mixing chamber 20 with an inlet area 22. As clearly can be seen, a gas entry 44, which has a nozzle 45, is offsetly arranged or is arranged in a nozzle distance d, respectively, in the direction of the inlet area 22 or inlet opening 24, respectively. This distance advantageously is less than 15 mm, preferably less than 10 mm, especially preferably less than 5 mm.

Above the insert 60 or in continuation of the powder receptacle 42, respectively, a lid 80 is arranged, forming a turbulence chamber 46 with the insert 60 or regulating device 10, respectively. A main flow HR will be introduced into the turbulence chamber 46 through a regulating orifice 28 (or a multitude of partial flows TR will be introduced through multiple regulating orifices 28, respectively). Herein the regulating device 10 is arranged in an outlet area 26 of the mixing chamber 20. At the right portion of the mixing chamber 20 an outlet opening 48 is arranged, which serves for the withdrawal of the main flow HR, in this case of the powder and gas mixture, to the bottom.

FIG. 6 shows a preferred embodiment of an insert 60 in a perspective representation. The insert 60 comprises a mixing chamber 20, which has an inlet area 22 with an inlet opening 24. Opposite to the inlet area 22 the mixing chamber 20 has an outlet area 26, wherein the regulating device 10 is arranged in the outlet area 26. The regulating device 10 comprises at least one regulating orifice 28 and a wall 21. In the embodiment preferably represented in FIG. 6, the insert 60 comprises three apertures 49, which in the preferred embodiment may be arranged in front of an outlet opening 48. The apertures 49 are components of a ring (without reference number), which in the preferred embodiment of the insert 60, as represented, is arranged on the mixing chamber 20 by way of three supporting bars 41.

LIST OF REFERENCE NUMBERS 10 regulating device
20 mixing chamber
21 wall
22 inlet area
24 inlet opening
26 outlet area
28 regulating orifice
40 powder container
41 supporting bar
42 powder receptacle
44 gas entry
45 nozzle
46 turbulence chamber
48 outlet opening
49 aperture
60 insert
80 lid
α, β, γ angle
HR main flow
TR partial flow
d nozzle distance

The invention claimed is:

1. A mixing device for mixing a powder with pressurized gas, comprising:
a mixing portion having an inner surface, an outer surface, a first end proximal to an inlet area and a second end proximal to an outlet, wherein a mixing chamber is defined by the inner surface of the mixing portion and extends along a first axis from the inlet area to the outlet, the inlet area including at least one inlet opening, by way of which at least one of a powder or pressurized gas is introducible into the mixing chamber, the mixing chamber having a regulating device with a plurality of regulating orifices at an end of the mixing chamber, wherein the regulating orifices are an only outlet pathway for withdrawing from the mixing chamber a main flow, the main flow of the introduced powder or pressurized gas flowing through the mixing chamber, wherein the plurality of regulating orifices of the regulating device are in fluid communication with the mixing chamber and are configured to be in direct communication with a turbulence chamber, wherein the mixing portion includes a plurality of supporting bars proximal to the second end of the mixing chamber and formed as radial ribs forming an extended plane and extending radially outward from the outer surface of the mixing portion, and wherein the regulating device and the support bars regulate the main flow.

2. The mixing device according to claim 1, further comprising:
a powder receptacle surrounding the mixing portion, the powder receptacle having at least one opening; and
a lid enclosing the at least one opening, wherein at least the inlet area of the mixing chamber is in fluid communication with the powder receptacle.

3. The mixing device according to claim 1, further comprising:
the turbulence chamber, wherein the turbulence chamber is above the mixing device, in fluid communication with the mixing chamber, and is configured to receive powder supplied from a powder receptacle.

4. The mixing device according to claim 1, wherein the plurality of regulating orifices extend transversely to the direction of the main flow.

5. The mixing device according to claim 1, wherein
the plurality of regulating orifices divide the main flow within the mixing chamber into a plurality of partial flows.

6. The mixing device according to claim 5, wherein cross sections of at least two of the plurality of regulating orifices fall within a plane transverse to, the direction of the main flow in the mixing chamber, and wherein the cross sections of the at least two regulating orifices differ in cross-sectional area.

7. The mixing device according to claim 1, wherein the plurality of regulating orifices have a cross-sectional area, and wherein a ratio of the cross-sectional area of each of the at least one inlet opening to the cross-sectional area of each of the regulating orifice is >1.

8. The mixing device according to claim 1, wherein the mixing chamber is conically tapered in the direction of the inlet area so that a cross sectional area of the mixing chamber at an inlet area is less than a cross sectional area of the mixing chamber at a location proximal to the regulating device.

9. The mixing device according to claim 1, wherein the mixing chamber has a length, a diameter and a diameter in the direction of the main flow, and wherein at least one of the length, diameter, or diameter in the direction of flow is based on characteristics of the at least one of the introduced powder or pressurized gas received therein.

10. The mixing device of claim 9, wherein characteristics of the at least one of the introduced powder or pressurized gas include a particle size.

11. A mixing device, comprising:
a mixing portion, having an inner surface, an outer surface, and extending from a first end to a second end, the mixing portion having at least one inlet area proximal to the first end, an outlet area proximal to the second end of the mixing portion, a mixing area at least partially defined by the inner surface and extending from the at least one inlet area to the outlet area, and a plurality of supporting bars proximal to the second end of the mixing portion and formed as radial ribs forming a series of extended planes extending radially outward from the outer surface of the mixing portion, wherein the mixing area is configured to receive at least one selected from a group consisting of a powder or a pressurized gas;
a regulating device with a plurality of regulating orifices at the second end of the mixing portion and forming a plurality of passages extending from the inner surface to the outer surface of the mixing portion, wherein the regulating orifices are an only pathway out of the mixing area, wherein the regulating device and the supporting bars regulate a main flow of the at least one of the powder or a pressurized gas; and
a turbulence chamber, wherein the turbulence chamber is in direct fluid communication with the plurality of regulating orifices of the regulating device and the turbulence chamber is configured to receive at least one of the powder or a gas.

12. The mixing device according to claim 11, further comprising:
a powder receptacle surrounding the mixing portion, the powder receptacle having at least one opening and a lid enclosing the at least one opening;
wherein the at least one inlet area of the mixing portion is in fluid communication with the powder receptacle;
wherein, when the at least one selected from the group consisting of the powder or the gas includes a powder; and
wherein the mixing area receives the powder from the powder receptacle.

13. The mixing device according to claim 12, wherein, the mixing device is formed to be contiguous with the lid.

14. The mixing device according to claim 12, wherein the lid forms a portion of the turbulence chamber.

15. A mixing device, comprising:
a mixing portion having an inner surface, an outer surface, at least one inlet area at a first end of the mixing portion, an outlet area at a second end of the mixing portion, and a mixing chamber at least partially defined by the inner surface and extending from the at least one inlet area to the outlet area, wherein the mixing chamber is formed as a conical extension, and has an axis extending from the inlet area to the outlet area, the mixing chamber being configured to receive at least one selected from a group consisting of a powder or a pressurized gas;
a plurality of supports at the second end of the mixing portion and formed as radial ribs forming an extended plane that extends radially outward from the outer surface of the mixing portion; and
a regulating device at the outlet area of the second end of the mixing portion with a plurality of regulating orifices extending from the inner surface to the outer surface of the mixing portion, wherein the regulating orifices are an only outlet pathway of the mixing chamber, wherein the regulating device and plurality of supports regulate a flow of the at least one selected from the group consisting of the powder or the gas exiting the mixing chamber.

16. The mixing device of claim 15, wherein the plurality, of regulating orifices and are positioned to be in direct communication with a turbulence chamber of the mixing device
so that the turbulence chamber is in fluid communication with the mixing chamber and is configured to receive powder supplied from a powder receptacle.

17. The mixing device according to claim 16, wherein the powder receptacle surrounds the mixing portion, and wherein the powder receptacle has at least one opening, the mixing device further comprises:
a lid enclosing one of the at least one opening, wherein at least the inlet area of the mixing portion is in fluid communication with the powder receptacle.

18. The mixing device according to claim 17, wherein the powder receptacle further comprises:
at least one gas inlet, through which a pressurized gas is introduced into the powder receptacle and the turbulence chamber;
wherein the at least one of the powder or gas is withdrawn from the powder receptacle and the turbulence chamber through at least one outlet opening.

19. The mixing device according to claim 18,
wherein each one of the plurality of regulating orifices has a first central axis and the outlet opening has a second central axis that intersects the first central axis, wherein both the first and second axis extend in a direction that is transverse with the axis of the mixing chamber and at least one first axis of each one of the plurality of regulating orifices forms an angle ($\alpha$) with respect to the second axis.

* * * * *